US012594770B2

(12) United States Patent
Boerstal et al.

(10) Patent No.: US 12,594,770 B2
(45) Date of Patent: Apr. 7, 2026

(54) FLUID DISTRIBUTION DEVICE FOR AN INKJET PRINT HEAD ASSEMBLY

(71) Applicant: CANON KABUSHIKI KAISHA, Tokyo (JP)

(72) Inventors: Hendricus G. J. Boerstal, Velden (NL); Peter J. Hollands, Baarlo (NL); Mahnaz Shokrpour Roudbari, Essen (DE)

(73) Assignee: Canon Kabushiki Kaisha, Tokyo (JP)

( * ) Notice: Subject to any disclaimer, the term of this patent is extended or adjusted under 35 U.S.C. 154(b) by 148 days.

(21) Appl. No.: 18/560,068

(22) PCT Filed: May 11, 2022

(86) PCT No.: PCT/EP2022/062786

§ 371 (c)(1),
(2) Date: Nov. 9, 2023

(87) PCT Pub. No.: WO2022/238483

PCT Pub. Date: Nov. 17, 2022

(65) Prior Publication Data

US 2024/0300246 A1 Sep. 12, 2024

(30) Foreign Application Priority Data

May 12, 2021 (NL) ..................................... 2028209

(51) Int. Cl.
*B41J 2/175* (2006.01)

(52) U.S. Cl.
CPC ....... *B41J 2/17563* (2013.01); *B41J 2/17513* (2013.01); *B41J 2/17553* (2013.01); *B41J 2/17556* (2013.01)

(58) Field of Classification Search
CPC ................................ B41J 2/17563; B41J 2/19
See application file for complete search history.

(56) References Cited

U.S. PATENT DOCUMENTS

| | | | |
|---|---|---|---|
| 6,296,352 | B1 | 10/2001 | Hollands et al. |
| 7,063,414 | B2 | 6/2006 | Harakawa |
| 8,020,982 | B2 | 9/2011 | Mun et al. |
| 8,480,213 | B2 | 7/2013 | Akiyama et al. |
| 2012/0062659 | A1 | 3/2012 | Tsubaki |
| 2013/0135404 | A1 | 5/2013 | Murray |
| 2014/0146112 | A1 | 5/2014 | Murray |

(Continued)

FOREIGN PATENT DOCUMENTS

| | | | |
|---|---|---|---|
| CN | 101310988 | A | 11/2008 |
| CN | 101861246 | A | 10/2010 |

(Continued)

*Primary Examiner* — Judy Nguyen
(74) *Attorney, Agent, or Firm* — Canon U.S.A., Inc. IP Division

(57) ABSTRACT

A compact fluid distribution device for a print head assembly is provided, which device allows for the effective removal of gas from the device during operation and purging. The device comprises a fluid chamber with a fluid permeable filter forming a dividing wall in the fluid chamber, such that an inlet is positioned on a first side of the filter and the outlet is positioned on a second side of the filter. The filter is inclined with respect to a first direction parallel to a vertical direction during operation, such that a first volume in the fluid chamber between the filter and a first side wall facing the filter tapers in a direction away from the inlet.

12 Claims, 2 Drawing Sheets

(56) References Cited

U.S. PATENT DOCUMENTS

| | | | |
|---|---|---|---|
| 2019/0224981 | A1 | 7/2019 | Yamagishi |
| 2020/0376843 | A1 | 12/2020 | Reinten et al. |

FOREIGN PATENT DOCUMENTS

| | | | |
|---|---|---|---|
| CN | 102371769 | A | 3/2012 |
| CN | 102762384 | A | 10/2012 |
| JP | 2006263996 | A | 10/2006 |
| JP | 2010137393 | A | 6/2010 |
| JP | 2010201698 | A | 9/2010 |
| JP | 2010208275 | A | 9/2010 |
| JP | 2012056248 | A | 3/2012 |
| JP | 2012218398 | A | 11/2012 |
| JP | 2016002682 | A | 1/2016 |
| JP | 2017222061 | A | 12/2017 |
| JP | 2019217669 | A | 12/2019 |
| WO | 2009066612 | A1 | 5/2009 |

FLUID DISTRIBUTION DEVICE FOR AN INKJET PRINT HEAD ASSEMBLY

CROSS REFERENCE TO RELATED APPLICATIONS

This application is a National Stage Entry of PCT/EP2022/062786, filed May 11, 2022, which claims the benefit of Netherlands Application No. 2028209, filed May 12, 2021, all of which are hereby incorporated by reference herein in their entireties.

BACKGROUND OF THE INVENTION

1. Field of the Invention

The invention relates to a fluid distribution device for a print head assembly.

2. Description of Background Art

A print head assembly, as known from e.g. US 2012062659 A, generally comprises a fluid distribution device to distribute fluid or ink to the individual droplet forming units of one or more print head units. Each droplet forming unit comprises a pressure chamber from which droplets of the fluid may be jetted by applying a pressure pulse to the pressure chamber by means of an actuator positioned in or adjacent the pressure chamber. The fluid distribution device may comprise a filter for filtering the fluid and/or a damper element to absorb pressure pulses traveling through the fluid to prevent the pulses from affecting the pressure in the pressure chambers. The fluid distribution device may further be provided with a return channel which allows the fluid to be continuously recirculated between the device and a central reservoir. This results in a manifold comprising various bends and corners, wherein gas bubbles may become entrapped inside the fluid distribution device. Said gas bubbles may accumulate into larger gas pockets and affect the performance of the fluid distribution device, such as its throughflow and/or filter capacity. It is known that gas bubbles may be removed via e.g. the return channel and/or via the nozzles for example by means of a so-called purge flow, though in practice often some gas remains inside the device after purging.

SUMMARY OF THE INVENTION

It is an object of the invention to provide an improved fluid distribution device, specifically with regard to its overall size, footprint, costs, and/or performance.

In accordance with the present invention, a fluid distribution device for a print head assembly according to claim 1 is provided. The fluid distribution device comprises:

- a fluid chamber provided with an inlet and a print head supply outlet, which are configured for a fluid connection to respectively a supply channel and at least one droplet forming unit;
- a fluid permeable filter forming a dividing wall in the fluid chamber, such that the inlet is positioned on a first side of the filter and the print head supply outlet is positioned on a second side of the filter opposite the first side, wherein the filter is inclined with respect to a first direction, said first direction being parallel to a vertical direction during operation, such that, when viewed in said first direction, a first volume between the filter and a first side wall facing the filter tapers in a direction away from the inlet.

The filter is positioned slanted with respect to the first direction. In consequence of the skewness or inclination of the filter, the first volume between the filter and one of its opposing side walls of the fluid chamber narrows in the first direction. The cross-section of the first volume perpendicular to the first direction at the inlet decreases moving away from the inlet in the first direction. This allows for a relatively larger effective area of the filter without increasing the footprint of the fluid chamber. The large effective area of the filter improves the fluid throughflow and may also contribute to increasing the lifetime of the filter. Thereby the object of the present invention has been achieved.

More specific optional features of the invention are indicated in the dependent claims.

In an embodiment, the inlet is positioned at a top wall of the fluid chamber and the print head supply outlet is positioned at a bottom wall opposite the top wall. Top and bottom are herein defined with respect to the first direction being parallel to the vertical direction, as during operation of the device. Both the top wall and the bottom wall comprise at least one opening, wherein fluid flows respectively into and out of the fluid chamber, preferably in along or against the first direction. During operation fluid enter the fluid chamber in substantially the vertical direction and exits the fluid chamber in the same direction. This further reduces the effective footprint of the fluid distribution device, since, as seen from above, the inlet and the print head supply outlet overlap with the fluid chamber.

In an embodiment, the filter extends from the bottom wall to the top wall. Preferably, the filter contacts the bottom wall and the top wall. This allows for a relatively large filter area, which is beneficial for the operation and the lifetime of the filter. The filter preferably has a total effective area greater than that of a vertical cross-section of the fluid chamber running through the filter, since the filter is inclined with respect to the first direction.

In an embodiment, the bottom wall is longitudinal in a second direction perpendicular to the first direction, and wherein the filter extends parallel to the second direction. Print head units are generally longitudinal, due to their one or more rows of large numbers of nozzles. The vertical footprint of the fluid distribution device is kept small by following the longitudinal shape of the print head units to which it is connected. The second direction is preferably parallel to the direction of the one or more nozzle rows. In consequence, the length of the bottom wall of the fluid chamber in the second direction is larger than its width in a third direction, perpendicular to both the first and second directions. A large filter area is achieved by having the filter extend substantially parallel to the second direction. The first volume tapers when viewed in the second direction, but preferably not (or at least significantly less) when viewed in the third direction.

In an embodiment, the filter extends parallel to the second direction. An edge of the filter is positioned at an edge of the bottom, which is also parallel to the second direction. From said edge, the filter inclines in the third direction towards the opposite edge of the bottom wall. Preferably, another edge of the filter contacts the top wall, while other edges of the filter are in contacts with the side walls of the fluid chamber in the second direction. Preferably, the fluid chamber is dimensioned, such that said side walls have the small area of all walls defining the fluid chamber.

In an embodiment, the filter further extends from and/or contacts both side walls of the fluid chamber in the second direction. When viewed in the third direction, the total area of the fluid chamber is filled by the filter. When viewed in the third direction, the filter extends to and/or contacts a full circumference of the fluid chamber. The filter extends along the top wall, bottom wall, and the side walls in the second direction. Due to the inclination the total and/or effective area of the filter is greater than a cross-sectional area of the fluid chamber, for a cross-sectional plane in the first and second directions.

In an embodiment, the print head supply outlet comprises at least two outlet openings in the bottom wall, which outlet openings are spaced apart from one another in the second direction. Due to the inclination of the filter a relatively large area is available for the print head supply outlet in the bottom wall, such that its total open area can be relatively large. Having two or more spaced apart outlet openings further contributes to a more homogeneous supply of fluid to the print head units, as sufficient fluid supply to each nozzle is required for optimal performance. Preferably, the two outlet openings are at different positions in the third direction as well.

In an embodiment, when viewed in the first direction, the filter at least partially overlaps with the print head supply outlet. This allows for a relatively large filter without reducing the cross-section of the print head supply outlet and/or adjusting its position. The filter extends at least partially over the print head supply outlet. The filter is positioned between the inlet and the print head supply outlet. Preferably, the inlet is positioned in a wall opposite the wall comprising the print head supply outlet. A top wall of the fluid chamber may for example comprise the inlet while the print head supply outlet is provided in or at a bottom wall during operation. Similarly, In another embodiment, when viewed in the first direction, the filter at least partially overlaps the inlet. As such a relatively large filter can be applied without compromise to the position and/or size of the inlet. Preferably, the filter, when viewed in the first direction, at least partially overlaps the inlet as well as the print head supply outlet. Preferably, the filter is inclined to the first direction at an angle of at least 10°.

In an embodiment, the fluid distribution device further comprises a return channel for returning fluid, the return channel bypassing the fluid chamber, and a first vent channel connecting the fluid chamber to the return channel, such that a first vent channel inlet of the fluid chamber is positioned on the second side of the filter. The return channel runs parallel to the fluid chamber and preferably to a supply channel connected to the inlet. The fluid effectively flows through the return channel in opposite direction to the average or main flow direction through the inlet and/or in the fluid chamber. The first vent channel is configured for removing gas bubbles from the fluid chamber into the return channel, specifically from a second volume of the fluid chamber downstream of the filter, the second side of the filter herein being the downstream side. The first vent channel's cross-section may be narrow compared to that of the inlet and or return channel, to reduce the loss of fluid through the first vent channel. The first vent channel is preferably provided at a highest point of the second volume measured upwards against the first direction. The first vent channel provides means for removing gas accumulating at the top of the second volume. A gas bubble or pocket, which partially obstructs the filter, can be removed and/or prevented by means of the first vent channel. The first vent channel allows the substantially entire second volume to be filled with fluid during a purge by removing gas via the first vent channel.

In an embodiment, when viewed in said first direction, a second volume between the filter and a second side wall opposite the first side wall tapers against the first direction towards the first vent channel. The first vent channel inlet is preferably positioned in the top wall of the fluid chamber over the second volume. A top edge of the filter is positioned closer to the first vent channel inlet than its bottom edge, measured perpendicular to the first direction. This results in the second volume tapering towards the first vent channel inlet to direct gas bubbles into the relatively narrow first vent channel. Since the first vent channel inlet is relatively small the arrangement is space-efficient.

In an embodiment, the first vent channel inlet and the print head supply outlet are positioned on opposite sides of the fluid chamber in the first direction, while in another embodiment, the inlet and the print head supply outlet are positioned on opposite sides of the fluid chamber in the first direction. The inlet and preferably the first vent channel inlet may be provided in or at the top wall, wherein the first vent channel inlet is separated from the inlet by the filter. The print head supply outlet is preferably positioned facing the top wall having the inlet and/or the first vent channel inlet, for example in a bottom wall of the fluid chamber.

Preferably, the first vent channel is inclined with respect to the first direction, such that during operation the first vent channel inlet is below a connection between the first vent channel and the return channel. A first vent channel outlet is positioned higher than the first vent channel inlet, during operation. The upwards inclination in the desired flow direction of the first vent channel results in a more efficient gas bubble removal due to the effect of gravity on the gas bubbles.

In an embodiment, a cross-section of the first vent channel is substantially smaller than that of the inlet and/or print head supply outlet. The effective area of the first vent channel is less than preferably 30%, very preferably less than 20%, even more preferably less than 10% of the average inlet or return channel area.

In an embodiment, the fluid distribution device further comprises a damper element comprising a deformable membrane positioned on the second side of the filter in the fluid chamber. When viewed in the first direction the damper element, the filter, the inlet, and the print head supply outlet overlap with the bottom wall. Also, the filter overlaps with the inlet and the print head supply outlet. The overlapping may be partial. The deformable membrane is part of a damper element positioned in the second volume. The deformable membrane is able to deform to absorb pressure pulses travelling through the fluid, which pressure pulses may originate from the image forming units and/or the fluid supply upstream of the inlet. By eliminating pressure fluctuations the performance of the print head units is increased. The damper element is conveniently positioned such that a single damper element suffices for absorbing pressure pulses originating from either the upstream or downstream the damper element. When viewed from above during use, the above mentioned components are all positioned overlapping with the footprint of the bottom wall, creating a compact device.

In an embodiment, the deformable membrane extends along a second side wall of the fluid chamber, the second side wall extending substantially in the first direction during operation. The second side wall is substantially vertical during operation and the membrane is mounted over it, such that an expansion volume is formed between the membrane and the second side wall. The membrane is allowed to deform into the expansion volume to reduce and/or eliminate pressure fluctuations or pulses in the fluid. Preferably, the deformable membrane extends along a full length of the second side wall between a top and bottom wall of the fluid chamber, thereby fluidically sealing off a portion of the fluid chamber between the second side wall and the membrane. This allows for a relatively large area of the membrane, which improves its absorbing qualities. The sealed off portion forms the expansions volume and the second side wall may be provided with openings to connect the expansion volume to the ambient. This results in an efficient and low costs damper element.

In an embodiment, an edge, preferably the bottom edge, of the filter is positioned in a corner between a bottom wall comprising the print head supply outlet and the first side wall on the inlet side of the filter. The bottom edge of the filter is attached at the outer, bottom corner of the first volume in the fluid chamber. From there the filter extends upwards in a slanting manner towards the outer, top corner of the second volume.

In an embodiment, the top wall is formed of two top wall portions positioned at different heights in the first direction, the top wall portions being connected by an intermediate wall portion extending in the first direction, and wherein an edge of the filter is attached to the intermediate wall portion. The intermediate wall portion allows for securing the edge of the filter without bending and thereby damaging the filter. The bottom edge of the filter may be locally secured to the first side wall. The remaining side edges of the fluid chamber may be configured to extend the intermediate wall portion towards the bottom wall. This provides a convenient holder for placing and securing the filter which eases manufacturing of the fluid distribution device.

In an embodiment, the fluid distribution device further comprises a fluid distribution manifold for distributing fluid towards at least one image forming unit, the fluid distribution manifold being in fluid connection to the print head supply outlet for receiving fluid and to a return channel for removing fluid from the fluid distribution manifold and at least one second vent channel extending between the return channel and the supply channel and/or the fluid chamber for moving gas bubbles into the return channel, wherein the return channel comprises a first narrowed portion at the vent channel to establish a local reduction in static pressure for drawing in gas bubbles. The first channel may be provided at the second volume of the fluid chamber and/or a second vent channel may be provided between the supply channel and the return channel to remove gas bubbles rising through the supply channel. This allows gas accumulation to be removed from the first volume. The efficiency of removing gas bubbles may be increased by locally reducing the cross-section of the return channel at the first and/or second vent channel. This results in a local increase in the fluid velocity along the exit of the first and/or second vent channel, which causes a reduction in the static pressure. In consequence, the static pressure difference across the first and/or second vent channel is increased, providing an increased driving force for forcing gas bubbles through the respective vent channel.

In an embodiment, the first narrowed portion has a cross-sectional area less than half of the cross-sectional area of the return channel, preferably less than 40% of the cross-sectional area of the return channel, very preferably less than 30% of the cross-sectional area of the return channel. The cross-section is inversely proportional to the fluid velocity, and in consequent to the static pressure. The static pressure scales for example roughly quadratically with the fluid velocity, so decreasing the cross-section is an efficient manner of reducing the static pressure and thereby the driving force for pushing gas bubbles into the return channel.

In an embodiment, the supply channel and the return channel are substantially parallel lines approximate to one another. This creates a space efficient configuration. Preferably both the supply channel and the return channel extend in the first direction, such that during operation gas bubbles are able to rise efficiently through said channels. The supply channel and the return channel are preferably positioned in proximity to another. By positioning said channels close to one another, the return channel extends at least partially along and near the supply channel, which allows for a relatively small or short second vent channel. Preferably, the length of the second vent channel and/or a distance between the return channel and the supply channel is less than half, preferably less than a quarter, of a length and/or width of the fluid chamber in a direction perpendicular to the first direction, preferably parallel to the filter and or membrane. A relatively short second vent channel allows for effective gas bubble removal. Advantageously, the supply channel and the return channel may be positioned at the side of the fluid chamber which comprises the first vent channel outlet to allow for a relatively short length of both vent channels.

In an embodiment, the return channel bypasses the fluid chamber and is mounted on the fluid distribution manifold. The fluid distribution manifold is positioned fluidically between the fluid chamber and the return channel as well as between the fluid chamber and the image forming units of the at least one print head unit. A portion of the fluid is supplied to the image forming units, while the return channel allows for a constant circulation of fluid through the fluid distribution manifold regardless of the activities of the image forming units. The return channel preferably has a length in the first direction of at least that of the supply channel and the fluid chamber combined.

In an embodiment, the return channel extends along and approximate to the fluid chamber, wherein the first vent channel is formed between a top portion of the fluid chamber and the return channel, and wherein a second vent channel is formed between the supply channel and the return channel remote from the fluid chamber. To remove gas accumulation from the first and second volumes on opposite sides of the filter in the fluid chamber, two vent channels are provided. The first vent channel connects the top or highest portion of the second volume to the return channel to remove gas accumulation from the second volume of the fluid chamber. The second vent channel is provided at the supply channel, which supply channel connects to a top wall portion over the first volume of the fluid chamber. Gas bubbles in the first volume are thereby allowed to escape via the supply channel. In consequence, gas accumulation on both sides of the filter in the fluid chamber is prevented and/or can be removed. The vent channels contribute to gas removal both during normal operation as well as during a purge action, wherein fluid is forced into the fluid chamber at an increased pressure. During purging substantially all gas accumulation can be forced from the first and second volume, allowing the fluid chamber to be filled entirely with fluid covering both sides of the filter. This extends the throughflow capacity and/or the lifetime of the filter.

In an embodiment, the supply channel comprises a second narrowed portion positioned at the vent line, which second narrowed portion extends above the at least one vent channel in the direction of gravity during operation. The supply channel narrows at and/or above the second vent channel during operation. This effectively results in a reduction of the cross-section of the supply channel in the rising direction of the gas bubbles. The cross-section reduction is preferably sudden, such as an obstruction or step along the inner wall of the supply channel. This narrowing disrupts the gas bubbles' trajectory, making them more prone to enter the second vent channel. Thereby, the efficiency of the gas removal is improved. The narrowing preferably concerns a cross-section reduction of at least 50%, preferably at least 40%, very preferably at least 30%, and even more preferably at least 20%.

In an embodiment, the supply channel, the return channel, and the fluid chamber are formed from injection molded plastic, and preferably at least a part of the fluid chamber was integrally formed with the supply channel and/or the return channel. To reduce costs the fluid distribution device is partially formed by means of injection molding. Therein, one or more components may be formed integrally in the same mold, such as for example the supply channel and a first portion of the fluid chamber.

In an embodiment, the print head supply outlet and inlet are positioned on opposite sides of the fluid chamber in a first direction in which first direction the supply channel and return channel extend during operation. The inlet is positioned at a top wall, which faces a bottom wall holding the print head supply outlet. This allows for the supply channel to be at least partially positioned over the fluid chamber, when seen in the first direction. Likewise, the print head supply outlet overlaps with the bottom wall when viewed in the first direction. This keeps the footprint of the fluid distribution device relatively small, while allowing for a relatively large filter area. Preferably, the inlet is positioned on a side of the top wall at or near the first side wall which faces the inlet side of the filter.

The present invention further relates to an inkjet print head assembly comprising a fluid distribution device according to the present invention in fluid connection to at least one print head unit.

The present invention further relates to an inkjet printer comprising a print head assembly comprising a fluid distribution device according to the present invention in fluid connection to at least one print head unit.

Further scope of applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein.

DETAILED DESCRIPTION OF THE PREFERRED EMBODIMENTS

Figure 1:
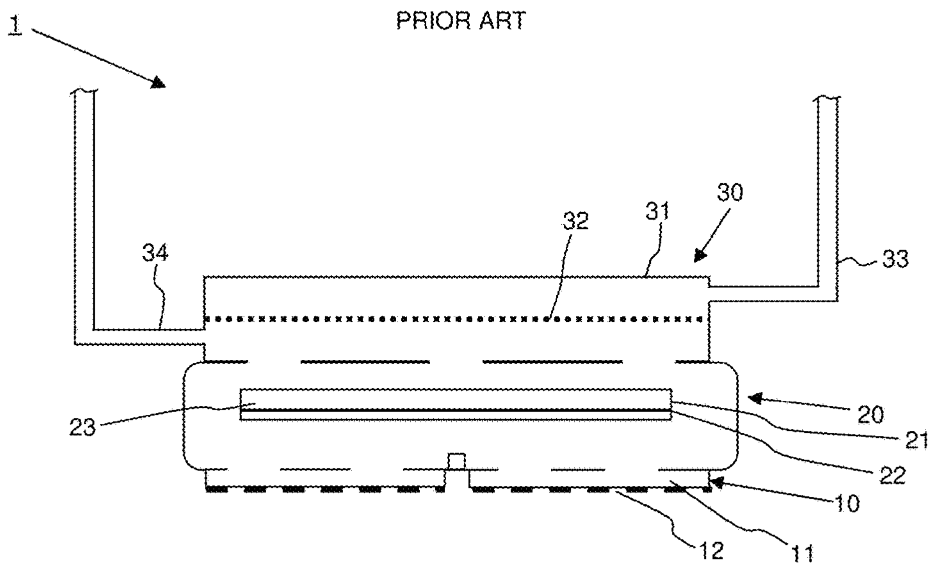
FIG. 1 is a schematic cross-sectional view of a fluid distribution device as known in the prior art.

The present invention will now be described with reference to the accompanying drawings, wherein the same reference numerals have been used to identify the same or similar elements throughout the several views.

FIG. 1 discloses a print head assembly as known in the prior art. The print head assembly comprises a plurality of print head units 10 mounted on the bottom side of a fluid distribution device 1. The print head units 10 comprise a plurality of image forming units each comprising a nozzle 12 connected to a pressure chamber (not shown) in which pressure chamber a pressure pulse can be applied to jet a droplet of fluid from the nozzle 12. Suitable actuators for generating the pressure pulse may be e.g. piezo-electric actuator, a thermal actuator, or so-called bubblejet actuator. Fluid is supplied to the print head units 10 via a fluid distribution manifold 20. The fluid distribution chamber 20 is provided with a damper element 21 to prevent pressure pulses from one image forming unit to affect the pressure in a pressure chamber of another image forming unit. The damper element 21 comprises a deformable, elastic membrane 22 which is able to absorb pressure pulses by bending into an expansion volume 23, which is sealed off from the chamber 20. Fluid is supplied to the fluid distribution chamber 20 via a filter unit 30, which is formed of a fluid chamber 31 divided by a porous membrane 32. The membrane's openings are suitably narrow for preventing larger dirt particles or gas bubbles from reaching the print head units 10. On its inlet side the fluid chamber is connected to a supply channel 33 for receiving fluid, while on the opposite side of the membrane 32, the fluid chamber 31 is provided with return channels 34 for recirculating the fluid back to a central reservoir. A drawback of the known print head assembly is gas entrapment in any of its components. Small gas bubbles are transported or formed in the fluid during its course through the print head assembly and become trapped in corners and other dead spaces in the device 1. The gas bubbles interact to form larger air pockets, which prevent fluid from accessing from all areas of the print head assembly. It is known to remove such air pockets by so-called purging using a relatively high pressure flow or counterflow to drive out the air pockets, though in practice some residual gas remains trapped inside the device 1 even after purging. Further, the known print head assemblies are relatively complex or large in terms of components and/or volume.

Figure 2:
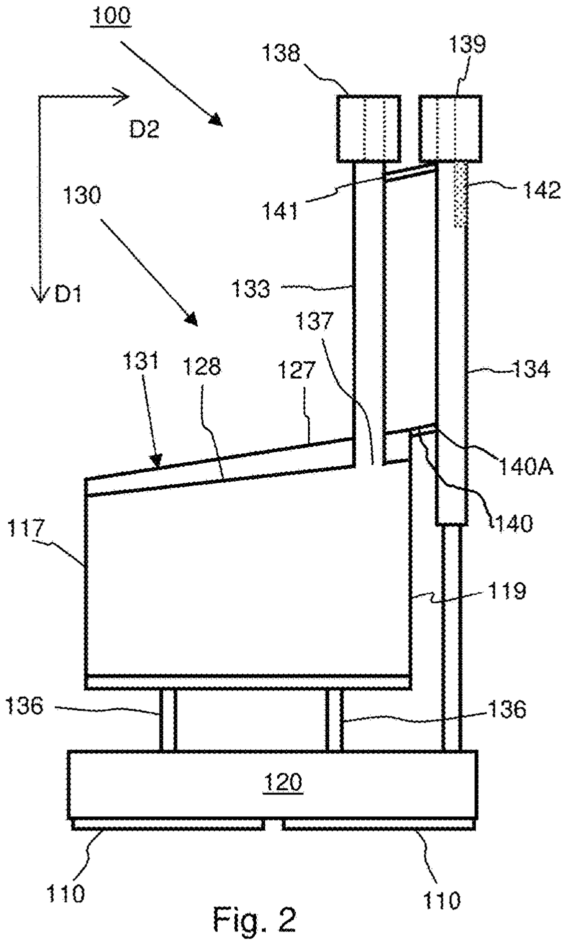
FIG. 2 is a schematic front view of a fluid distribution device according to the present invention.
Figure 3:
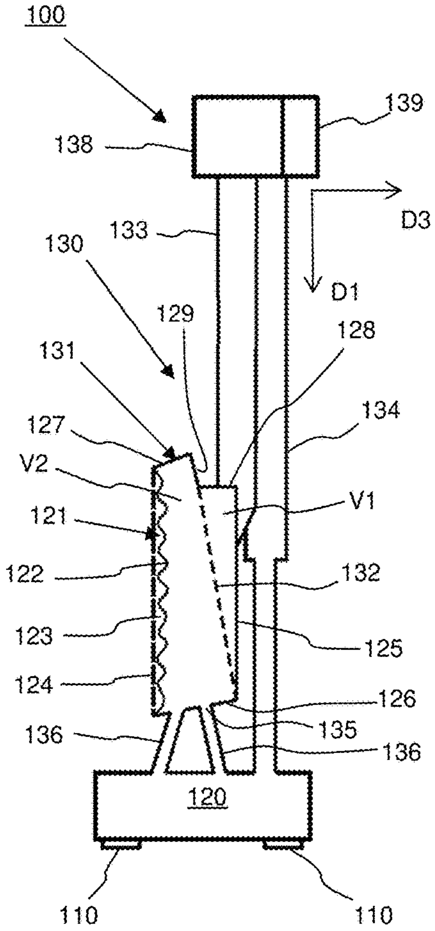
FIG. 3 is a schematic side view of the fluid distribution in FIG. 2.
Figure 4:
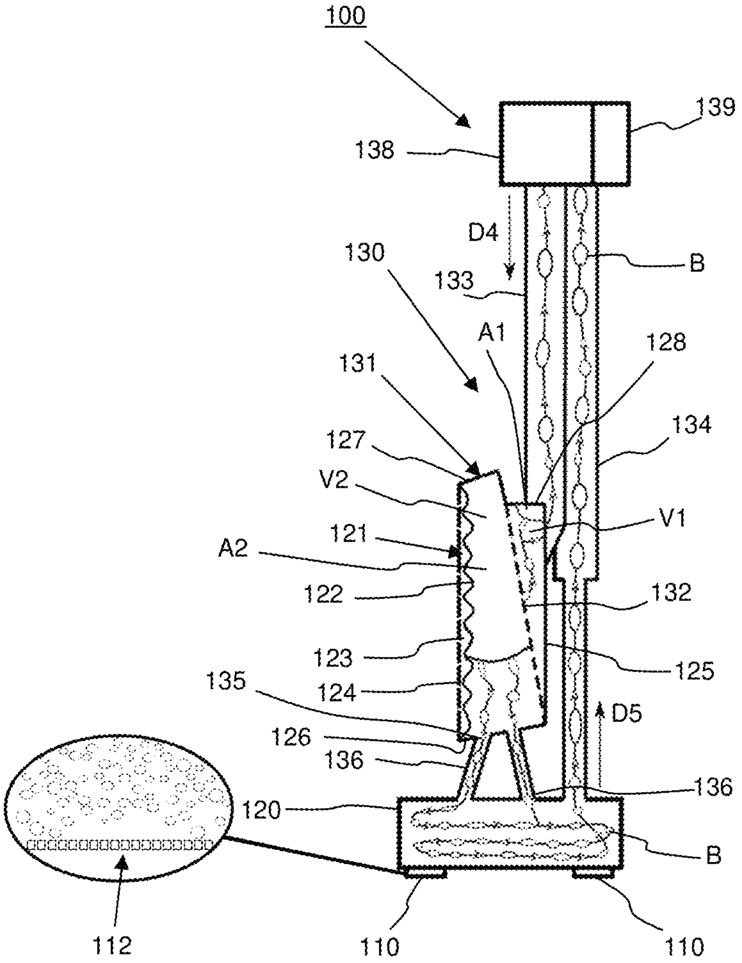
FIG. 4 is a schematic front view illustrating the trajectories of gas bubbles through fluid in the fluid distribution device in FIG. 2.

A compact and productive print head assembly 100 according to the present invention is shown in FIGS. 2, 3 and 4. A fluid distribution device 130 is mounted in fluid connection therewith on a fluid distribution manifold 120, which fluid distribution manifold 120 holds and supplies the image forming units of the print head units 110 with fluid. The fluid distribution device 130 is connected to one or more fluid supply reservoirs (not shown) via its fluid interface elements 138, 139. The supply channel 133 and the return channel 134 are each provided with their respective fluid interface elements 138, 139. The supply channel 133 extends vertically in the first direction D1, which during operation is parallel to the direction of gravity. The supply channel 133 forms an inlet 137 in a top wall portion 128 of the fluid chamber 131. The fluid chamber 131 comprises a filter 132 formed of a fluid permeable membrane, which divides the fluid chamber 131 into a first, upstream volume V1 and a second, downstream volume V2. The filter 132 forms a barrier between the first and second volumes V1, V2 which barrier prevents particles above a certain size threshold from passing through. The second volume V2 of the fluid chamber 131 holds a damper element 121, formed of a deformable membrane 122 extending along a second side wall 124 of the fluid chamber 131. The second side wall 124 may be provided with openings to improve the functioning of the damper element 121. The membrane 122 has been mounted on or over the second side wall 124 to seal off the portion of the second side wall 124 which comprises said openings. Preferably, the deformable membrane 122 extends along a full length of the second side wall 124 between the respective top wall portion 127 and the bottom wall 126 of the fluid chamber 131.

The top wall portion 127 is slanted or inclined upwards towards a first vent channel 140 towards a vent channel inlet 140A which first vent channel 140 connects the second volume V2 to the return channel 134. The first vent channel 141 is a relatively narrow channel as compared to the channels 133, 134 to reduce the amount of fluid flowing back into the return channel 134. This allows gas or gas bubbles to be removed from the fluid in the second volume V2 without a substantial loss of fluid flow in the main fluid transport direction.

The bottom wall 126 of the fluid chamber 131 is provided with at least one print head supply outlet 135, which opens up into one or more print head supply channels 136 through which fluid is transported from the second volume V2 to the fluid distribution manifold 120. The fluid distribution manifold comprises a plurality of channels which supply fluid to the print head units 110 as well as to the return channel 134 for recirculating fluid back to the one or more central reservoirs. The return channel 134 bypasses the fluid chamber 131 and extends parallel to the supply channel 133. The supply channel 133 and the return channel 134 are positioned in close proximity on the same side of the fluid chamber 131 to allow for the connection of the supply channel 133 to the return channel 134 via a second vent channel 141. The second vent channel 141 removes gas bubbles from the supply channel 133 and the first volume V1, preventing said gas bubbles from travelling back towards the fluid chamber 131. Due to the adjacent positioning of the supply channel 133 and the return channel 134 on the higher side of the second volume V2 of the fluid chamber 131, both vent channels 140, 141 may be relatively short, allowing for efficient gas bubbles removal.

FIG. 4 illustrates the trajectories of gas bubbles B in the print head assembly 100 shown in FIG. 2. The gas bubbles B flow towards the print head units 110 and circulate through the fluid distribution manifold 120. From the fluid distribution manifold 120 the gas bubbles travel upwards through the return channel 134 in the return flow direction D5. Similarly, gas bubbles B may travel against the fluid supply direction D4 upwards through the supply channel 133. The gas bubbles B may originate from and/or accumulate in the fluid chamber 131. The accumulation A1 of gas bubbles B gathers at the top of the first volume V1, which could prevent proper inflow of fluid as well partially block off the filter 132, which reduces the throughflow of fluid towards the print head units 110. The gas bubbles B could further accumulate in the second volume V2, forming the accumulation A2. This accumulation A2 could reduce the throughflow through the fluid chamber 131. The fluid distribution device 130 according to the present invention offers several measures to reduce and/or remove the accumulation of gas bubbles B, which measures will be described here below.

To reduce such accumulation and/or to remove gas bubbles vent channels 140, 141 are provided to direct gas bubbles into the return channel 134. A first vent channel 140 is provided at the top wall portion 127 of the second volume V2 to remove gas from the accumulation A2. The first vent channel 140 is preferably provided at the highest point of the first volume V2. To reduce or prevent gas accumulation in the first volume V1 (as well as in the second volume V2) the supply channel 133 has been connected to the return channel 134 via a second vent channel 141. The second vent channel 141 at least partially removes gas bubbles rising through the supply channel 133 into the return channel 134. Preferably the inlet 137 of the supply channel 133 is provided at the highest point of the first volume V1. The vent channels 140, 141 are preferably relatively narrow to reduce the loss of fluid via the vent channels 140, 141, for example with a diameter or cross-section of no more than 40%, preferably 30%, very preferably 20%, and even more preferably 10% of that of the supply channel 133 and/or return channel 134.

The return channel 134 comprises a narrowed portion 142 at the height position of the second vent channel 141. The narrowed portion 142 provides a local reduction in the cross-sectional area of the return channel 134, for example a reduction of at least 40%, preferably at least 30% of the area. This reduction may be achieved by locally reducing the diameter of the return channel as it is formed and/or by providing an insertable obstruction with a through-hole as shown in FIG. 2. By locally decreasing the cross-sectional area of the return channel 134, the fluid velocity in the return channel 142 along the second vent channel 141 is locally increased. This results in a local decrease of the static pressure, which improves the drawing in of gas bubbles through the second vent channel 141. As a consequence of Bernoulli's law the narrowed portion increases the static pressure difference across the second vent channel 141 between the supply channel 133 and the return channel 134. The increased pressure difference provides a driving force for driving gas bubbles through the second vent channel 141 into the return channel 134. A narrow portion may further be applied to the return channel 134 at the first vent channel 140.

A further improvement for driving gas bubbles through the second vent channel 141 may be achieved by locally reducing the cross-sectional area of the supply channel 133 at the second vent channel 141. Thereto, as shown in FIG. 2, the supply interface element 138 is provided with a smaller effective diameter than the lower portion of the supply channel 133. This reduction diameter may be achieved by an insertable obstruction with a through-hole and/or by a reduced effective diameter of the supply interface element 138 as compared to that of the supply channel 133. It was found that the local reduction in cross-sectional area in the supply channel 133 forms an obstruction in the path of gas bubbles rising up through the supply channel 133. This obstruction disrupts the trajectory of the gas bubbles, making them more prone to enter the second vent channel 141. Preferably, the narrowing is sudden by means of a step or protrusion in the supply channel 133.

To reduce the entrapment of gas bubbles B in the first volume V1, the inlet 137 of the supply channel 133 is preferably provided at the, during operation, highest portion of the top wall portion 128. Preferably, the top wall portion 128 is slanted upwards towards the inlet 137. Under the influence of gravity gas bubbles B are thereby directed towards the inlet 137 and into the supply channel 133. This configuration is advantageous during operation as well as during a purge action, allowing the substantially full first volume V1 to be filled with fluid.

The top wall portion 127 of the second volume V2 may also be inclined upwards towards the first vent channel 140 to aid in directing gas bubbles B towards the first vent channel 140. As the diameter of the first vent channel 140 is relatively small compared to a cross-section of the second volume V2, the second volume V2 may further be tapered towards the first vent channel 140 to direct the gas bubbles B into the first vent channel 140. The small first vent channel 140 leaves room for e.g. curving and/or inclining the top wall, such that the first vent channel is positioned at the highest point. The top wall comprises the top wall portions 127, 128 which are positioned respectively over the second and first volumes V2, V1. The top wall portion 127 of the second volume V2 is positioned at a different height than the top wall portion 128 of the first volume V1, such that a vertically extending intermediate top wall portion 129 is formed between the top wall portions 127, 128. The top edge of the filter 132 is attached to said intermediate top wall portion 129. This allows for a secure attachment to the top wall without folding and potentially damaging the filter 132, while allowing for the placement of the inlet 137 and the second vent channel 140 at the top wall. The intermediate top wall portion 129 may be extended circumferentially around the filter 132 to form an attachment ridge along the partial or full length of the filter 132. The intermediate top wall portion 129 allows for a slanted positioning of the filter 132 by positioning its stop edge closer to the first vent channel 140 than its bottom edge, measured in a direction perpendicular to the first direction.

The fluid distribution device 130 further allows for a compact construction with a relatively low number of components. This reduces costs as well the footprint of the print head assembly, allowing for a compact construction. Thereto, the filter 132 has been positioned at an inclined angle with respect to the first direction D1. A bottom edge of the filter 132 is positioned in or at a corner of the bottom wall 126 and the first side wall 125. The first side wall 125 faces and/or is opposite to the second side wall 124 against which the membrane 122 of the damper element 121 has been positioned. The filter 132 extends increasingly further away from the first side wall 125 upwards against the first direction D1. This results in a roughly triangular cross-section of the first volume V1 which is formed between the filter 132 and the first side wall 125. The length and/or area of the top wall portion 128 of the first volume V1 is substantially smaller than those of the filter 132 and the first side wall 125. The angle between the filter 132 and the first side wall 125 is acute, preferably less than 20°, very preferably less than 10°. The inlet 137 is positioned in the top wall portion 128 facing the acute angle between the filter 132 and the first side wall 125. When viewed in the first direction D1 the inlet 137 at least partially overlaps with the filter 132, since the inlet 137 is positioned over the filter 132. The top wall portions 127, 128 are positioned at different heights to create a vertically extending intermediate wall portion 129 against which the top edge of the filter 132 is secured. This allows for the positioning of the first vent channel 140 at the top of the second volume while positioning the top edge of the filter 132 nearer the first vent channel 140 than its bottom edge. The filter 132 extends from the bottom wall 126 to the top wall, resulting in a relatively large filter area. When viewed in the second direction D2, the first volume V1 tapers continuously, since the filter 132 is inclined over its full height in the first direction D1. When viewed in the third direction D3, the filter 132 does not substantially taper and has a constant length over the majority of its height. The length of filter 132 in the second direction D2 is greater than the width of the bottom wall 126 in the third direction D3. Also, the height of the filter 132 in the first direction is greater than the width of the bottom wall 126 in the third direction D3. Due to the inclination, a distance or length measured over the filter 132 between the bottom wall 126 and the top wall is greater than a height of the fluid chamber 131 in the first direction D1 between said walls. The area of the filter 132 though which fluid can flow is greater than a cross-sectional area of the fluid chamber 131 in the first and second directions D1, D2. The filter 132 contacts the circumferential walls of the fluid chamber 131 when viewed in the third direction D3. The edges of the filter 132 contact the top wall, bottom wall 126, and the third and fourth side walls 117, 119.

The inclination of the filter 132 results in a skewed wall of the second volume V2, which tapers the second volume V2 towards the first vent channel 140. The inclination further allows for a larger area of the filter 132. Opposite the filter 132 the membrane 122 of the damper element 121 is positioned. The damper element 121 extends fully along the second side wall 124, resulting in a relatively large and thus effective damper. The membrane 122 is formed of a corrugated foil as described in US 20200376843 A. The damper element 121 is positioned such that it is able to absorb not only pressure pulses originating from the print head units 110, but also to absorb pressure pulses or variations originating from the fluid supply travelling through the supply channel 133 in the first direction D1. When viewed in the first direction D1 the filter 132 overlaps with the top wall portion 128 of the first volume V1, but not with the top wall portion 127 of the second volume V2. In the same top down view, the top edge of the filter 132 is positioned nearer the first vent channel 140 than its bottom edge. Likewise, the top edge is preferably more remote from the inlet 137 than the bottom edge. To minimize the footprint, the first and first side walls 124, 125 are preferably parallel to one another and to the first direction D1. Likewise, the membrane 122 extends parallel to the second side wall 124 from its top side to its bottom side or between the top wall portion 127 and the bottom wall 126.

The bottom wall 126 is longitudinal in shape. The length of the bottom wall 126 as measured in the second direction D2 is significantly greater than its width in the third direction D3. The second and third directions D2, D3 are preferably both horizontal during use. By positioning the filter 132 at the edge of the bottom wall 126 on the side of the inlet 137, substantially the full area of the bottom wall 126 is available for the print head supply outlet 135. The print head supply outlet 135 comprises two outlet openings, each one defining a print head supply channels 136, which are spaced apart from one another along the second direction D2. In consequence, the filter 132, the damper element 121, the inlet 137, and the print head supply outlets 135 all overlap with the bottom wall 126, when viewed from above in the first direction D1. This ensures a small footprint, which allows for a close stacking of print heads. The height of fluid chamber 131 in the first direction D1 as well as its length in the second direction D2 are greater than its width in the direction D3. In consequence, the third and fourth side walls 117, 119 in the second directions are smaller than the other walls, being the top wall, bottom wall 126, first side wall 124, and the second side wall 125.

The filter 132 further overlaps with one of the print head supply outlets 135 when viewed in the first direction. The second volume V2 tapers towards the first vent channel 140. The top side of the filter 132 is positioned nearer the first vent channel 140 than the bottom side of the filter 132 in a direction perpendicular to the first direction.

Preferably, the fluid distribution device 130 is formed at least partially from injection molded plastic. Specifically the fluid chamber 131 may be formed of a plastic component, wherein the filter 132 and the membrane 122 have been mounted.

Although specific embodiments of the invention are illustrated and described herein, it will be appreciated by those of ordinary skill in the art that a variety of alternate and/or equivalent implementations exist. It should be appreciated that the exemplary embodiment or exemplary embodiments are examples only and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

It will also be appreciated that in this document the terms "comprise", "comprising", "include", "including", "contain", "containing", "have", "having", and any variations thereof, are intended to be understood in an inclusive (i.e. non-exclusive) sense, such that the process, method, device, apparatus or system described herein is not limited to those features or parts or elements or steps recited but may include other elements, features, parts or steps not expressly listed or inherent to such process, method, article, or apparatus. Furthermore, the terms "a" and "an" used herein are intended to be understood as meaning one or more unless explicitly stated otherwise. Moreover, the terms "first", "second", "third", etc. are used merely as labels, and are not intended to impose numerical requirements on or to establish a certain ranking of importance of their objects.

The present invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A fluid distribution device for a print head assembly, the fluid distribution device comprising:

a fluid chamber provided with an inlet and a print head supply outlet, which are configured for a fluid connection to respectively a supply channel and at least one droplet forming unit;

a fluid permeable filter forming a dividing wall in the fluid chamber such that the inlet is positioned on a first side of the fluid permeable filter and the print head supply outlet is positioned on a second side of the fluid permeable filter opposite the first side, and a return channel for returning fluid, wherein the fluid permeable filter is inclined with respect to a first direction, the first direction is parallel to a vertical direction during operation, such that, when viewed in the first direction, a first volume in the fluid chamber between the fluid permeable filter and a first side wall facing the fluid permeable filter tapers in a direction away from the inlet, and wherein the return channel bypasses the fluid chamber and a first vent channel connecting the fluid chamber to the return channel, such that a vent channel inlet is positioned on the second side of the fluid permeable filter.

2. The fluid distribution device according to claim 1, wherein the inlet is positioned at a top wall of the fluid chamber and the print head supply outlet is positioned at a bottom wall opposite the top wall.

3. The fluid distribution device according to claim 2, wherein the fluid permeable filter extends from the bottom wall to the top wall.

4. The fluid distribution device according to claim 3, wherein the fluid permeable filter contacts the bottom wall and the top wall.

5. The fluid distribution device according to claim 1, wherein, when viewed in the first direction, the fluid permeable filter at least partially overlaps the print head supply outlet.

6. The fluid distribution device according to claim 1, wherein, when viewed in the first direction, the fluid permeable filter at least partially overlaps the inlet.

7. The fluid distribution device according to claim 1, wherein a second volume between the fluid permeable filter and a second side wall opposite the first side wall tapers against the first direction towards the first vent channel.

8. The fluid distribution device according to claim 1, wherein the vent channel inlet and the print head supply outlet are positioned on opposite sides of the fluid chamber in the first direction.

9. The fluid distribution device according to claim 1, wherein the first vent channel is inclined with respect to the first direction, such that during operation the vent channel inlet is below a connection between the vent channel and the return channel.

10. A fluid distribution device for a print head assembly, the fluid distribution device comprising:

a fluid chamber provided with an inlet and a print head supply outlet, which are configured for a fluid connection to respectively a supply channel and at least one droplet forming unit;

a fluid permeable filter forming a dividing wall in the fluid chamber such that the inlet is positioned on a first side of the fluid permeable filter and the print head supply outlet is positioned on a second side of the fluid permeable filter opposite the first side, and a damper element that includes a deformable membrane positioned on the second side of the fluid permeable filter in the fluid chamber, wherein the fluid permeable filter is inclined with respect to a first direction, the first direction is parallel to a vertical direction during operation, such that, when viewed in the first direction, a first volume in the fluid chamber between the fluid permeable filter and a first side wall facing the fluid permeable filter tapers in a direction away from the inlet, wherein the inlet is positioned at a top wall of the fluid chamber and the print head supply outlet is positioned at a bottom wall opposite the top wall, wherein, when viewed in the first direction the damper element, the fluid permeable filter, the inlet, and the print head supply outlet overlap with the bottom wall, and the fluid permeable filter overlaps with the inlet and the print head supply outlet, and wherein the deformable membrane extends along a second side wall of the fluid chamber where the second side wall extends substantially in the first direction during operation.

11. The fluid distribution device according to claim 10, wherein an edge of the fluid permeable filter is positioned in a corner between a bottom wall comprising the print head supply outlet and the first side wall opposite the second side wall.

12. The fluid distribution device according to claim 10, wherein the top wall is formed of two top wall portions positioned at different heights in the first direction, the two top wall portions are connected by an intermediate wall portion extending in the first direction, and an edge of the fluid permeable filter is attached to the intermediate wall portion.

* * * * *